(12) United States Patent
Tang

(10) Patent No.: US 11,259,276 B2
(45) Date of Patent: Feb. 22, 2022

(54) METHOD AND DEVICE FOR SELECTING RESOURCES

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/645,782

(22) PCT Filed: Sep. 15, 2017

(86) PCT No.: PCT/CN2017/101901
§ 371 (c)(1),
(2) Date: Mar. 9, 2020

(87) PCT Pub. No.: WO2019/051782
PCT Pub. Date: Mar. 21, 2019

(65) Prior Publication Data
US 2020/0275411 A1 Aug. 27, 2020

(51) Int. Cl.
*H04W 4/00* (2018.01)
*H04W 72/02* (2009.01)

(52) U.S. Cl.
CPC .................. *H04W 72/02* (2013.01)

(58) Field of Classification Search
CPC ..... H04W 72/04; H04W 72/12; H04W 72/02; H04J 2203/0069; H04B 7/2121; H04B 7/2123
See application file for complete search history.

(56) References Cited

U.S. PATENT DOCUMENTS

2015/0327315 A1 11/2015 Xue et al.
2017/0006580 A1 1/2017 Patil et al.
(Continued)

FOREIGN PATENT DOCUMENTS

CN 106470485 A 3/2017
CN 106488560 A 3/2017
(Continued)

OTHER PUBLICATIONS

Huawei: "Event triggered reporting for inter RAT MLB" 3GPP Draft; R3-103277 Events for Inter RAT MLB, 3rd Generation Partnership Project(3GPP), Mobile Competence Centre; 650, Route Des Lucioles; F-06921 Sophia-Antipolis Cedex; France, vol. RAN WG3, No. Jacksonville, USA; Nov. 15, 2010, Nov. 8, 2010 (Nov. 8, 2010), XP050496478, [ retrieved on Nov. 8, 2010] * 2 Discussion *.
(Continued)

*Primary Examiner* — Shantell L Heiber
(74) *Attorney, Agent, or Firm* — Ladas & Parry, LLP

(57) ABSTRACT

Disclosed are a method and device for selecting resources, capable of achieving selection of resources under a condition of insufficient available resources or no available resources. The method comprises that: a terminal device determines that the proportion of the number of available resources in a candidate resource set to the total number of resources in the candidate resource set is less than a preset proportion, or the number of the available resources in the candidate resource set is less than a preset value; the terminal device determines a first available resource set in the candidate resource set; and the terminal device determines a resource for data transmission in the first available resource set.

14 Claims, 2 Drawing Sheets

300

```
S310: A terminal device determines that a proportion of the number of available resources in a candidate resource set to the total number of resources in the candidate resource set is lower than a preset proportion or the number of the available resources in the candidate resource set is smaller than a preset value S320: The terminal device determines a first available resource set in the candidate resource set S330: The terminal device determines a resource for data transmission in the first available resource set
```

(56) References Cited

U.S. PATENT DOCUMENTS

| | | | |
|---|---|---|---|
| 2017/0188391 A1 | 6/2017 | Rajagopal et al. | |
| 2018/0167914 A1 | 6/2018 | Zhang | |
| 2020/0092852 A1 | 3/2020 | Zhang | |
| 2020/0314803 A1* | 10/2020 | Zhang | ............ H04W 74/006 |

FOREIGN PATENT DOCUMENTS

| | | | |
|---|---|---|---|
| EP | 3282798 | 2/2018 | |
| EP | 3322241 A1 | 5/2018 | |
| RU | 2518376 C2 | 6/2014 | |
| WO | 2016163848 | 10/2016 | |
| WO | 2016209056 | 12/2016 | |
| WO | 2017028044 A1 | 2/2017 | |
| WO | WO-2017028044 A1 * | 2/2017 | ............ H04W 72/04 |

OTHER PUBLICATIONS

Supplementary European Search Report in the European application No. 17925120.2, dated Aug. 28, 2020.

First Office Action of the Russian application No. 2020112906, dated Oct. 9, 2020.

International Search Report in the international application No. PCT/CN2017/101901, dated May 30, 2018.

English translation of the Written Opinion of the International Search Authority in the international application No. PCT/CN2017/101901, dated May 30, 2018.

Written Opinion of the International Searching Authority in international application No. PCT/CN2017/101901, dated May 30, 2018 with English translation provided by Google Translate.

Office Action of the Indian application No. 202017015039, dated May 28, 2021.

Written Opinion of the Singaporean application No. 11202002184T, dated Sep. 1, 2021.

Hearing Notice of the Indian application No. 202017015039, dated Oct. 21, 2021.

* cited by examiner

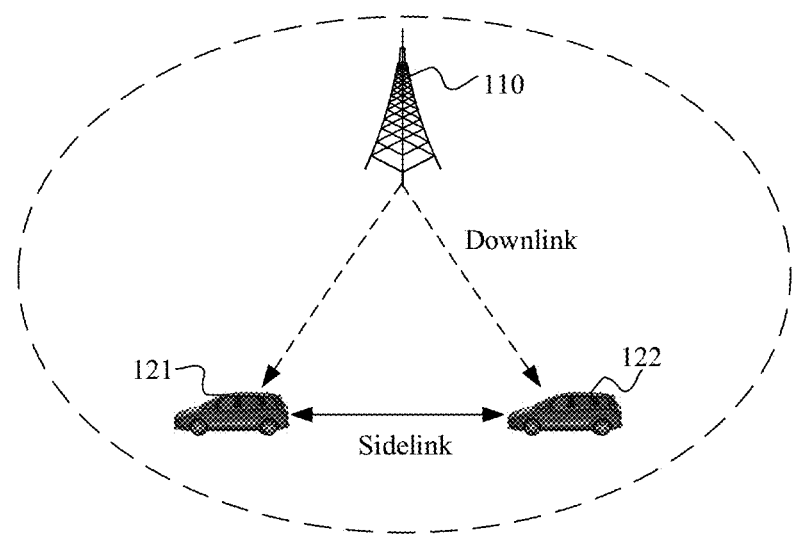

FIG. 1

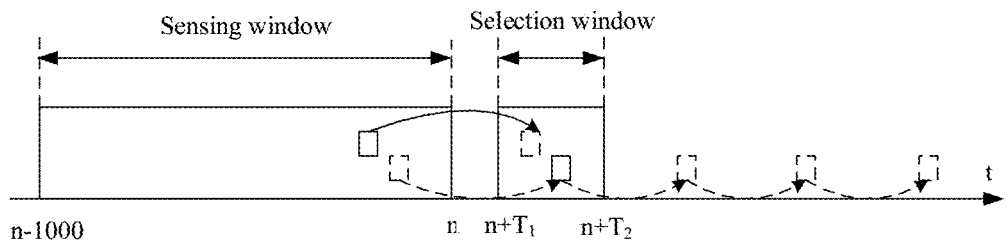

| S310: A terminal device determines that a proportion of the number of available resources in a candidate resource set to the total number of resources in the candidate resource set is lower than a preset proportion or the number of the available resources in the candidate resource set is smaller than a preset value |

| S320: The terminal device determines a first available resource set in the candidate resource set |

| S330: The terminal device determines a resource for data transmission in the first available resource set |

FIG. 3

METHOD AND DEVICE FOR SELECTING RESOURCES

CROSS-REFERENCE TO RELATED APPLICATION

This application is the U.S. national phase of PCT/CN2017/101901, filed on Sep. 15, 2017, the disclosure of which is incorporated by reference herein in its entirety.

TECHNICAL FIELD

Embodiments of the disclosure relate to the field of communications, and more particularly to a method and device for resource selection.

BACKGROUND

Internet of vehicles system involves a Sidelink (SL) transmission technology based on Long Term Evolution Device to Device (LTE D2D) communication. Unlike a conventional LTE system in which communication data is sent or received through a base station, an Internet of vehicles system adopts a D2D communication manner and thus is higher in spectrum efficiency and lower in transmission delay.

In 3rd Generation Partnership Project (3GPP) Release 14 (Rel-14), an Internet of vehicles technology, i.e., a Vehicle to Everything (V2X) technology, is standardized, and two transmission modes are defined: a mode 3 and a mode 4.

Specifically, in the mode 3, a transmission resource for Vehicle User Equipment (VUE) is allocated by a base station, and the VUE sends data on an SL according to the resource allocated by the base station. The base station may allocate a resource for single transmission to the terminal and may also allocate a resource for semi-persistent transmission to the terminal. In the mode 4, the VUE adopts a transmission manner combining sensing and reservation, and the terminal autonomously selects a transmission resource in SL resources. Specifically, the VUE acquires an available transmission resource collection in a resource pool in a sensing manner, and the terminal randomly selects a resource from the available transmission resource collection for data transmission.

However, in the mode 4, there may be cases where there are insufficient resources or no resources available in the available transmission resource collection. In this case, how to select resources is a problem urgent to be solved.

SUMMARY

A method and device for resource selection are provided, which may implement resource selection under the condition of insufficient available resources or no available resources.

According to a first aspect, there is provided a method for resource selection, which includes the following operations.

A terminal device determines that a proportion of a number of available resources in a candidate resource set to the total number of resources in the candidate resource set is lower than a preset proportion, or the number of the available resources in the candidate resource set is smaller than a preset value.

The terminal device determines a first available resource set in the candidate resource set.

The terminal device determines a resource for data transmission in the first available resource set.

Optionally, the preset proportion may be a proportion predetermined in a protocol, for example, 20%. The preset proportion may also be a proportion configured by a network. The preset value may be a number predetermined in the protocol, for example, 20. The preset value may also be a number configured by the network. There are no limits made thereto in the embodiments of the disclosure. In combination with the first aspect, in some implementations of the first aspect, the operation that the terminal device determines the first available resource set in the candidate resource set may include the following operation.

If the number of the available resources in the candidate resource set is not zero, the terminal device determines a set of the available resources in the candidate resource set as the first available resource set.

In combination with the first aspect, in some implementations of the first aspect, the operation that the terminal device determines the resource for data transmission in the first available resource set may include the following operation.

The terminal device randomly selects one or more resources from the first available resource set as resources for data transmission.

In combination with the first aspect, in some implementations of the first aspect, the operation that the terminal device determines the first available resource set in the candidate resource set may include the following operations.

The terminal device determines a first proportion according to a first parameter. The first proportion is used to indicate a proportion of a number of available resources that need to be selected to the total number of the resources in the candidate resource set.

The terminal device determines the first available resource set in the candidate resource set according to the first proportion.

In combination with the first aspect, in some implementations of the first aspect, the first parameter may include at least one of: a transmission delay of a service or duration of a resource selection window in a time domain. The resource selection window includes all the resources in the candidate resource set.

In combination with the first aspect, in some implementations of the first aspect, the first parameter may be the transmission delay of the service, and the operation that the terminal device determines the first proportion according to the first parameter may include the following operations.

The terminal device determines the first proportion according to a transmission delay of a present service and a first correspondence. The first correspondence is a correspondence between each of multiple transmission delays and a respective one of multiple proportions. Each of the multiple proportions is to indicate the proportion of the number of the available resources that need to be selected to the total number of the resources in the candidate resource set.

That is, the terminal device may determine the proportion of the available resources that need to be selected in the candidate resource set according to the transmission delay of the present service and the first correspondence and further select the available resources of the corresponding proportion from the candidate resource set according to the determined proportion. Since different transmission delays correspond to different proportions of available resources that need to be selected, the problem of insufficient resources or no available resources during resource selection of the terminal device may be solved to a certain extent.

In combination with the first aspect, in some implementations of the first aspect, the first correspondence may be configured for the terminal device by a network device, or the first correspondence may be pre-configured in the terminal device.

In combination with the first aspect, in some implementations of the first aspect, the first parameter may be the duration of the resource selection window in the time domain, and the operation that the terminal device determines the first proportion according to the first parameter may include the following operation.

The terminal device determines the first proportion according to duration of a presently used resource selection window in the time domain and a second correspondence. The second correspondence is a correspondence between duration of each of multiple resource selection windows in the time domain and a respective one of multiple proportions and each of the multiple proportions is to indicate the proportion of the number of the available resources that need to be selected to the total number of the resources in the candidate resource set.

That is, during resource selection, the terminal device may determine the proportion of the available resources that need to be selected in the candidate resource set according to the duration of the presently used resource selection window in the time domain and the second correspondence, and further select the available resources of the corresponding proportion from the candidate resource set according to the determined proportion. Since durations of different resource selection windows in the time domain correspond to different proportions of available resources that need to be selected, the problem of insufficient resources or no available resources during resource selection of the terminal device may be solved to a certain extent.

In combination with the first aspect, in some implementations of the first aspect, the second correspondence may be configured for the terminal device by the network device, or the second correspondence may be pre-configured in the terminal device.

Optionally, if the proportion of the number of the available resources in the candidate resource set to the total number of the resources in the candidate resource set is more than or equal to the first proportion, namely the number of the available resources in the candidate resource set is sufficient, the terminal device may determine the first available resource set in the available resources in the candidate resource set. A proportion of a number of resources in the first available resource set to the total number of the resources in the candidate resource set is the first proportion.

Optionally, if the proportion of the number of the available resources in the candidate resource set to the total number of the resources in the candidate resource set is lower than the first proportion and the number of the available resources in the candidate resource set is not zero, the terminal device may directly determine the available resources in the candidate resource set as the first available resource set and then select the resource for data transmission from the available resources in the candidate resource set. For example, the terminal device may randomly select one or more resources from the available resources in the candidate resource set as resources for data transmission.

Optionally, if the number of the available resources in the candidate resource set is zero, the terminal device may determine the candidate resource set as the first available resource set and then select the resource for data transmission from the candidate resource set. For example, the terminal device may randomly select one or more resources from the candidate resource set as resources for data transmission.

In combination with the first aspect, in some implementations of the first aspect, the method may further include the following operation.

If the proportion of the number of the available resources in the candidate resource set to the total number of the resources in the candidate resource set is lower than the first proportion, the terminal device sends first indication information to the network device.

The first indication information is to indicate at least one of: the proportion of the number of the available resources in the candidate resource set to the total number of the resources in the candidate resource set being lower than the first proportion, the total number of the resources in the candidate resource set or the number of the available resources in the candidate resource set.

That is, under the condition that the proportion of the number of the available resources in the candidate resource set to the total number of the resources in the candidate resource set is lower than the first proportion, the terminal device may report the first indication information to the network device. Furthermore, the terminal device may determine the set of the available resources in the candidate resource set as the first available resource set and may further determine the resource for data transmission in the first available resource set.

In combination with the first aspect, in some implementations of the first aspect, the operation that the terminal device determines the first available resource set in the candidate resource set according to the first proportion may include the following operations.

The terminal device receives a third correspondence sent by the network device. The third correspondence is a correspondence between each of multiple transmission delays and a respective one of multiple proportions.

The terminal device determines a second proportion according to the transmission delay of the present service and the third correspondence.

The terminal device determines the first available resource set in the candidate resource set according to the second proportion.

That is, under the condition that the proportion of the number of the available resources in the candidate resource set to the total number of the resources in the candidate resource set is lower than the first proportion, the terminal device may report the first indication information to the network device. The network device may send the third correspondence to the terminal device according to the first indication information to enable the terminal device to determine the first available resource set in the candidate resource set according to the third correspondence.

Optionally, the third correspondence is different from the first correspondence.

Optionally, the second proportion is lower than the first proportion.

In combination with the first aspect, in some implementations of the first aspect, the operation that the terminal device determines the first available resource set in the candidate resource set according to the first proportion may include the following operations.

The terminal device receives a fourth correspondence sent by the network device. The fourth correspondence is a correspondence between duration of each of multiple resource selection windows in the time domain and a respective one of multiple proportions.

The terminal device determines a third proportion according to the duration of the presently used resource selection window in the time domain and the fourth correspondence.

The terminal device determines the first available resource set in the candidate resource set according to the third proportion.

That is, under the condition that the proportion of the number of the available resources in the candidate resource set to the total number of the resources in the candidate resource set is lower than the first proportion, the terminal device may report the first indication information to the network device. The network device may send the fourth correspondence to the terminal device according to the first indication information to enable the terminal device to determine the first available resource set in the candidate resource set according to the fourth correspondence.

Optionally, the fourth correspondence is different from the second correspondence.

Optionally, the third proportion is lower than the first proportion.

In combination with the first aspect, in some implementations of the first aspect, the operation that the terminal device determines the first available resource set in the candidate resource set according to the first proportion may include the following operations.

The terminal device receives first configuration information sent by the network device.

The first configuration information is to regulate at least one of the following transmission parameters: a number of available Hybrid Automatic Repeat reQuest (HARQ) processes, a number of transmissions of a data packet in each HARQ process, a Modulation and Coding Scheme (MCS) level or a number of Physical Resource Blocks (PRBs) for each data packet.

The terminal device determines a regulated transmission parameter according to the first configuration information.

The terminal device determines the first available resource set in the candidate resource set according to the regulated transmission parameter.

That is, under the condition that the proportion of the number of the available resources in the candidate resource set to the total number of the resources in the candidate resource set is lower than the first proportion, the terminal device may report the first indication information to the network device. The network device may send new configuration information to the terminal device according to the first indication information to enable the terminal device to determine the first available resource set in the candidate resource set according to the new configuration information.

In combination with the first aspect, in some implementations of the first aspect, the operation that the terminal device sends the first indication information to the network device may include the following operation.

The terminal device sends uplink Radio Resource Control (RRC) signaling to the network device. The uplink RRC signaling includes the first indication information.

In general, in the embodiments of the disclosure, under the condition that the proportion of the number of the available resources in the candidate resource set to the total number of the resources in the candidate resource set is lower than the first proportion, resource selection of the terminal device may be implemented independent of feedback information of the network device. For example, the resource for data transmission is directly determined in the available resources in the candidate resource set. Resource selection of the terminal device may also be implemented according to the feedback information of the network device. For example, resource selection is performed according to the third correspondence, the fourth correspondence or the configuration information.

In combination with the first aspect, in some implementations of the first aspect, the operation that the terminal device determines the first available resource set in the candidate resource set according to the first proportion may include the following operations.

If the proportion of the number of the available resources in the candidate resource set to the total number of the resources in the candidate resource set is lower than the first proportion, the terminal device regulates the transmission parameters in at least one of the following manners: reducing a number of HARQ processes, reducing a number of transmissions of the data packet in each HARQ process, improving an MCS level or reducing a number of PRBs for each data packet.

The terminal device determines the first available resource set in the candidate resource set according to the regulated transmission parameter.

That is, if the proportion of the number of the available resources in the candidate resource set to the total number of the resources in the candidate resource set is lower than the first proportion, the terminal device may independently regulate its own transmission parameter to reduce the number of resources occupied by the terminal device in the resource selection window. When the number of the resources occupied by the terminal device in the resource selection window is reduced, the number of available resources that may be selected in the resource selection window is correspondingly increased, so that the problem of insufficient resources during resource selection of the terminal device is favorably solved.

In combination with the first aspect, in some implementations of the first aspect, the operation that the terminal device determines the first available resource set in the candidate resource set may include the following operations.

The terminal device determines a first value according to a first parameter. The first value is to indicate the number of the available resources that need to be selected in the candidate resource set.

The terminal device determines the first available resource set in the candidate resource set according to the first value.

Optionally, if the number of the available resources in the candidate resource set is more than or equal to the first value, namely the number of available resources in the candidate resource set is sufficient, the terminal device may determine the first available resource set in the available resources in the candidate resource set. The number of the resources in the first available resource set is the first value.

If the number of the available resources in the candidate resource set is larger than zero and smaller than the first value, the terminal device may directly determine the available resources in the candidate resource set as the first available resource set, namely selecting the resource for data transmission from the available resources in the candidate resource set. For example, the terminal device may randomly select one or more resources from the available resources in the candidate resource set as resources for data transmission.

Optionally, if the number of the available resources in the candidate resource set is zero, the terminal device may determine the candidate resource set as the first available resource set and then determine the resource for data transmission in the candidate resource set. For example, the terminal device randomly selects one or more resources from the candidate resource set as resources for data transmission.

In combination with the first aspect, in some implementations of the first aspect, the first parameter may include at least one of: the transmission delay of the service or the duration of the resource selection window in the time domain. The resource selection window includes all the resources in the candidate resource set.

In combination with the first aspect, in some implementations of the first aspect, the first parameter may be the transmission delay of the service, and the operation that the terminal device determines the first value according to the first parameter may include the following operations.

The terminal device determines the first value according to the transmission delay of the present service and a fifth correspondence. The fifth correspondence is a correspondence between each of multiple transmission delays and a respective one of multiple values, and each of the multiple values is to indicate the number of the available resources that need to be selected.

In combination with the first aspect, in some implementations of the first aspect, the fifth correspondence may be configured for the terminal device by the network device, or the fifth correspondence may be pre-configured in the terminal device.

In combination with the first aspect, in some implementations of the first aspect, the first parameter may be the duration of the resource selection window in the time domain, and the operation that the terminal device determines the first value according to the first parameter may include the following operation.

The terminal device determines the first value according to the duration of the presently used resource selection window in the time domain and a sixth correspondence. The sixth correspondence is a correspondence between duration of each of multiple resource selection windows in the time domain and a respective one of multiple values and each of the multiple values is to indicate the number of the available resources that need to be selected.

In combination with the first aspect, in some implementations of the first aspect, the sixth correspondence may be configured for the terminal device by the network device, or the sixth correspondence may be pre-configured in the terminal device.

In combination with the first aspect, in some implementations of the first aspect, the method may further include the following operation.

If the number of the available resources in the candidate resource set is smaller than the first value, the terminal device sends second indication information to the network device.

The second indication information is to indicate at least one of: the number of the available resources in the candidate resource set being smaller than the first value, the total number of the resources in the candidate resource set or the number of the available resources in the candidate resource set.

In combination with the first aspect, in some implementations of the first aspect, the operation that the terminal device determines the first available resource set in the candidate resource set according to the first value may include the following operations.

The terminal device receives a seventh correspondence sent by the network device. The seventh correspondence is a correspondence between each of multiple transmission delays and a respective one of multiple values.

The terminal device determines a second value according to the transmission delay of the present service and the seventh correspondence.

The terminal device determines the first available resource set in the candidate resource set according to the second value.

Optionally, the seventh correspondence is different from the fifth correspondence.

Optionally, the second value is smaller than the first value.

In combination with the first aspect, in some implementations of the first aspect, the operation that the terminal device determines the first available resource set in the candidate resource set according to the first value may include the following operations.

The terminal device receives an eighth correspondence sent by the network device. The eighth correspondence is a correspondence between duration of each of multiple resource selection windows in the time domain and a respective one of multiple values.

The terminal device determines a third value according to the duration of the presently used resource selection window in the time domain and the eighth correspondence.

The terminal device determines the first available resource set in the candidate resource set according to the third value.

Optionally, the eighth correspondence is different from the sixth correspondence.

Optionally, the third value is smaller than the first value.

In combination with the first aspect, in some implementations of the first aspect, the operation that the terminal device determines the first available resource set in the candidate resource set according to the first value may include the following operations.

The terminal device receives second configuration information sent by the network device.

The second configuration information is to regulate at least one of the following transmission parameters: a number of available HARQ processes, a number of transmissions of the data packet in each HARQ process, the MCS level or a number of PRBs for each data packet.

The terminal device determines the regulated transmission parameter according to the second configuration information.

The terminal device determines the first available resource set in the candidate resource set according to the regulated transmission parameter.

In general, under the condition that the number of the available resources in the candidate resource set is smaller than the first value, resource selection of the terminal device may be implemented independent of the feedback information of the network device. For example, the resource for data transmission is directly determined in the available resources in the candidate resource set. Resource selection of the terminal device may also be implemented according to the feedback information of the network device. For example, resource selection is performed according to the seventh correspondence, the eighth correspondence or the second configuration information.

In combination with the first aspect, in some implementations of the first aspect, the operation that the terminal device sends the second indication information to the network device may include the following operation.

The terminal device sends uplink RRC signaling to the network device. The uplink RRC signaling includes the second indication information.

In combination with the first aspect, in some implementations of the first aspect, the operation that the terminal device determines the first available resource set in the candidate resource set according to the first value may include the following operations.

If the number of the available resources in the candidate resource set is smaller than the first value, the terminal device regulates the transmission parameters in at least one of the following manners: reducing a number of HARQ processes, reducing a number of transmissions of the data packet in each HARQ process, improving the MCS level or reducing a number of PRBs for each data packet.

The terminal device determines the first available resource set in the candidate resource set according to the regulated transmission parameter.

That is, if the number of the available resources in the candidate resource set is smaller than the first value, the terminal device may independently regulate its own transmission parameter to reduce the number of the resources occupied by the terminal device in the resource selection window. When the number of the resources occupied by the terminal device in the resource selection window is reduced, the number of the available resources that may be selected in the resource selection window is correspondingly increased, so that the problem of insufficient resources during resource selection of the terminal device is favorably solved.

In a second aspect, there is provided a device for resource selection, which is configured to execute the method in the first aspect or any possible implementations of the first aspect. Specifically, the device includes units configured to execute the method in the first aspect or any possible implementations of the first aspect.

In a third aspect, there is provides a device for resource selection, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementations of the first aspect.

In a fourth aspect, there is provided a computer storage medium, which is configured to store a computer software instruction for executing the method in the first aspect or any possible implementations of the first aspect, including a program designed to execute the abovementioned aspects.

A fifth aspect provides a computer program product including an instruction, which runs in a computer to enable the computer to execute the method in the first aspect or any optional implementations of the first aspect.

BRIEF DESCRIPTION OF DRAWINGS

FIG. 1 is a schematic diagram showing an application scenario according to an embodiment of the disclosure.

FIG. 2 is a schematic diagram of sensing a resource pool by a terminal device.

FIG. 3 is a schematic flowchart of a data transmission method according to an embodiment of the disclosure.

DETAILED DESCRIPTION

Figure 4:
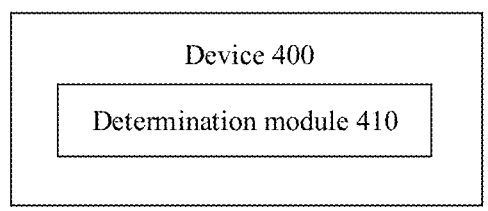
FIG. 4 is a schematic block diagram of a data transmission device according to an embodiment of the disclosure.

The technical solutions in the embodiments of the disclosure will be described below in combination with the drawings in the embodiments of the disclosure.

It is to be understood that the technical solutions of the embodiments of the disclosure may be applied to various communication systems, for example, an LTE system, an LTE Frequency Division Duplex (FDD) system, an LTE Time Division Duplex (TDD) system, a 4.5th Generation (4.5G) network, a 5th Generation (5G) network and New Radio (NR). The embodiments of the disclosure may also be applied to a Vehicle to Everything (V2X) system, for example, a Vehicle to Vehicle (V2V) system, or may further be applied to a D2D system. The embodiments of the disclosure are not limited thereto.

It is to be understood that the terminal device in the embodiments of the disclosure may also be called a terminal, User Equipment (UE), a Mobile Station (MS), a Mobile Terminal (MT) and the like. The terminal device may be VUE, for example, a vehicle or a wireless terminal for self driving. The terminal device may also be Pedestrian User Equipment (PUE), for example, a mobile phone, a pad and a computer with a wireless transceiver function.

It is to be understood that a network device involved in the embodiments of the disclosure is a device deployed in a radio access network to provide a wireless communication function for the terminal device. The network device may be a base station, and the base station may include various forms of macro base stations, micro base stations, relay stations, access points and the like. In systems adopting different radio access technologies, devices that function as base stations may have different names. For example, the device is called an Evolved NodeB (eNB or eNodeB) in an LTE network and is called a Node B in a 3rd Generation (3G) network, etc.

The embodiments of the disclosure may be applied to various application scenarios. FIG. 1 is a schematic diagram of an Internet of vehicles system that the embodiments of the disclosure are applied to. As shown in FIG. 1, the network device in the Internet of vehicles system may be a base station 110, and the terminal device may be VUE, for example, a vehicle 121 and a vehicle 122.

As described above, in the Internet of vehicles system, a mode 3 or a mode 4 may be adopted by a terminal device for data transmission. Specifically, in the mode 4, the terminal device may adopt a manner combining sensing and reservation for data transmission. FIG. 2 is a schematic diagram of sensing a resource pool by a terminal device. As shown in FIG. 2, when a new data packet arrives at a moment n, the terminal device is required to select a resource. The terminal device may perform resource selection in a resource selection window $[n+T_1, n+T_2]$ milliseconds (ms) according to a sensing result in a period of time in the past (for example, 1 s), by way of example but not limitation, $T_1 \leq 4$ and $20 \leq T_2 \leq 100$. Specifically, the terminal device may select the resource in the resource selection window [n+T1, n+T2] ms according to a sensing result in a sensing window [n−1000, n−1] ms. All resources in the resource selection window [n+T1, n+T2] ms are recorded as resource A, and the terminal device executes the following exclusion operations on the resource A to determine final available resources.

In S1, if the terminal device does not obtain any sensing result in some subframes in the sensing window, the resources corresponding to the subframes in the resource selection window are excluded.

In S2, when the terminal device detects a Physical Sidelink Control Channel (PSCCH) in the sensing window, if Reference Signal Received Power (RSRP) of a Physical Sidelink Shared Channel (PSSCH) corresponding to the PSCCH is higher than a preset threshold and there is a resource conflict between a next transmission resource reserved by the PSCCH and a resource for sending data to be sent of the terminal device, the terminal device excludes the resource from the set A.

In S3, the terminal device performs Receive Signal Strength Indication (RSSI) detection on the remaining resources in the set A, sequences them according to energy and puts 20% (relative to the number of the resources in the set A) of the resources with lowest energy into a set B.

In S4, the terminal device equiprobably selects one resource from the set B for data transmission.

For reducing a transmission delay, the terminal device may select a value of T2 that is less than 20 ms. However, under this condition, the following problems may exist.

1: The terminal device may adopt two concurrent HARQ processes for data transmission, and each data packet in each HARQ process may be transmitted twice, including an initial transmission and a retransmission. Since the terminal device adopts a half-duplex manner for data transmission, the terminal device may not receive data of another terminal device in a sending subframe, namely sensing may not be implemented. Since at most four sending subframes are occupied by the two HARQ processes, if the selected T2 is excessively small, T2−T1<4 ms, and there may be no available transmission resources for the terminal device in the resource selection window.

2: The T2 selected by the terminal device causes the number of the available resources determined within the resource selection window [n+$T_1$, n+$T_2$] ms to be less than 20% of the total number of the resources in the set A.

In view of this, the embodiments of the disclosure provide a method for resource selection, to implement resource selection under the condition of insufficient available resources or no available resources.

FIG. 3 is a schematic flowchart of a method 300 for resource selection according to an embodiment of the disclosure. The method 300 may be applied to the Internet of vehicles system shown in FIG. 1, and the embodiment of the disclosure is not limited thereto.

As shown in FIG. 3, the method 300 includes the following contents.

At S310, a terminal device determines that a proportion of a number of available resources in a candidate resource set to a total number of resources in the candidate resource set is lower than a preset proportion, or the number of the available resources in the candidate resource set is smaller than a preset value.

It is to be understood that, in the embodiment of the disclosure, the candidate resource set is a set of all resources in a resource selection window. For example, the resource selection window is [n+$T_1$, n+$T_2$] ms, and then the candidate resource set may include all resources in [n+$T_1$, n+$T_2$] ms. For example, if $T_1$=4 and $T_2$ is equal to 20, the candidate resource set includes all resources between (n+4) ms and (n+20) ms. If a transmission subframe, i.e., 1 ms, is considered as a resource, the candidate resource set includes 17 resources.

It is to be noted that, in the embodiment of the disclosure, the preset proportion may be a proportion predetermined in a protocol, for example, 20%, or may also be a proportion configured by a network. The preset value may be a number predetermined in the protocol, for example, 20, or may also be a number configured by the network. There are no limits made thereto in the embodiment of the disclosure.

As described above, when new data arrives, the terminal device may perform resource selection in the resource selection window according to the steps described in S1-S4. Here, after S1 and S2, the remaining resources in the candidate resource set may be recorded as the available resources. If the proportion of the number of the available resources to the total number of the resources in the candidate resource set is lower than the preset proportion, or if the number of the available resources is smaller than the preset value, namely there are not enough available resources or no available resources, the terminal device may perform resource selection according to manners described in the subsequent embodiments.

At S320, the terminal device determines a first available resource set in the candidate resource set.

At S330, the terminal device determines a resource for data transmission in the first available resource set.

Optionally, if the number of the available resources in the candidate resource set is not zero, the terminal device may directly determine the available resources in the candidate resource set as the first available resource set and then determine the resource for data transmission in the first available resource set. For example, the terminal device may randomly select one or more resources from the first available resource set for data transmission. Specifically, a bottom layer (for example, a physical layer) of the terminal device may report the determined available resource set to a high layer (for example, a Radio Link Control (RLC) layer or a Packet Data Convergence Protocol (PDCP) layer, etc.) of the terminal device. The bottom layer of the terminal device may also report the candidate resource set to the high layer of the terminal device, to enable the high layer of the terminal device to perform resource selection according to the available resource set and the candidate resource set.

Optionally, if the number of the available resources in the candidate resource set is zero, the terminal device may determine the candidate resource set as the first available resource set and then determine the resource for data transmission in the candidate resource set. For example, the terminal device may randomly select one or more resources from the candidate resource set as resources for data transmission. For example, the candidate resource set includes all resources in [n+4, n+23], namely the candidate resource set includes 20 resources, and the available resources in the candidate resource set are all the resources in [n+8, n+19], namely the number of the available resources is 2. If the preset proportion is 20%, the proportion of the number of the available resources to the total number of the resources in the candidate resource set is 2/20=10%, which is lower than 20%. If the preset value is 4, the number of the available resources is 2, which is smaller than the preset value 4. Under this condition, the number of the available resources is not zero, and the terminal device may directly select the resource for data transmission from the available resources, for example, a transmission subframe corresponding to n+8 may be selected as the resource for data transmission.

Optionally, in an embodiment, S320 may further include the following operations.

The terminal device determines a first proportion according to a first parameter. The first proportion is used to indicate a proportion of a number of available resources that need to be selected to the total number of the resources in the candidate resource set.

The terminal device determines the first available resource set in the candidate resource set according to the first proportion.

Optionally, the first parameter includes at least one of: a transmission delay of a service or duration of a resource selection window in a time domain. The resource selection window includes all the resources in the candidate resource set. The first parameter may also include another parameter.

Resource selection according to the transmission delay of the service and the duration of the resource selection window in the time domain will be introduced below as an example, and the embodiment of the disclosure is not limited thereto.

Specifically, the terminal device may determine the first proportion according to at least one of the transmission delay of the service or the duration of the resource selection window in the time domain and then determine the first available resource set in the candidate resource set according to the first proportion. For example, a proportion of the number of resources in the first available resource set determined by the terminal device in the candidate resource set to the total number of the resources in the candidate resource set is the first proportion.

In a specific embodiment, the first parameter is the transmission delay of the service, and the operation that the terminal device determines the first proportion according to the first parameter includes the following operation.

The terminal device determines the first proportion according to a transmission delay of a present service and a first correspondence. The first correspondence is a correspondence between each of multiple transmission delays and a respective one of multiple proportions, and each proportion in the multiple proportions is to indicate the proportion of the number of the available resources that need to be selected to the total number of the resources in the candidate resource set.

Specifically, in the first correspondence, each of the multiple transmission delays may correspond to a respective proportion. During resource selection, the terminal device may determine the proportion of the available resources that need to be selected in the candidate resource set according to the transmission delay of the present service and the first correspondence, and further select the available resources from the candidate resource set according to the determined proportion. Since different transmission delays correspond to different proportions of available resources that need to be selected, the problem of insufficient resources or no available resources during resource selection of the terminal device may be solved to a certain extent.

For example, in the first correspondence, a proportion corresponding to a transmission delay of 100 ms is 20%, a proportion corresponding to a transmission delay of 20 ms is 10% and a proportion corresponding to a transmission delay of 10 ms is 5%. If the transmission delay of the present service is 20 ms, the terminal device may determine according to the first correspondence that the first proportion is 10%. That is, the terminal device is required to select 10% of available resources from the candidate resource set. If the candidate resource set includes 20 resources and the number of the available resources in the candidate resource set is 2, the terminal device may determine that the two available resources constitute the first available resource set and further determine the resource for data transmission in the two available resources. It is advantageous to solve the problem of insufficient resources when the proportion of the number of the available resources to the total number of the resources in the candidate resource set is lower than the preset proportion (for example, 20%).

Optionally, in the embodiment of the disclosure, the first correspondence is configured for the terminal device by a network device, or the first correspondence is pre-configured in the terminal device.

For example, the network device may configure the first correspondence for the terminal device through semi-persistent signaling (for example, RRC signaling) or dynamic signaling (for example, Downlink Control Information (DCI)).

In another specific embodiment, the first parameter is the duration of the resource selection window in the time domain, and the operation that the terminal device determines the first proportion according to the first parameter includes the following operation.

The terminal device determines the first proportion according to duration of a presently used resource selection window in a time domain and a second correspondence. The second correspondence is a correspondence between duration of each of multiple resource selection windows in the time domain and a respective one of multiple proportions, and each proportion in the multiple proportions is to indicate the proportion of the number of the available resources that need to be selected to the total number of the resources in the candidate resource set.

Specifically, in the second correspondence, the duration of each of the multiple resource selection windows in the time domain may correspond to a respective proportion. During resource selection, the terminal device may determine the proportion of the available resources that need to be selected in the candidate resource set according to the duration of the presently used resource selection window in the time domain and the second correspondence and further select the available resources from the candidate resource set according to the determined proportion.

In the embodiment, if the duration of the resource selection window in the time domain is relatively long, the number of the available resources remaining in the resource selection window after the exclusion operations in S1 and S2 is relatively large. That is, the number of the available resources that may be selected is relatively large. Therefore, a relatively long duration of the resource selection window in the time domain may correspond to a relatively high proportion. That is, the duration of the resource selection window in the time domain may be directly proportional to the proportion.

By way of example but not limitation, in the second correspondence, a proportion corresponding to duration of 50 ms of the resource selection window in the time domain is 20%, a proportion corresponding to duration of 20 ms of the resource selection window in the time domain is 10%, and a proportion corresponding to duration of 10 ms of the resource selection window in the time domain is 5%. If the duration of the resource selection window that is presently used, in the time domain is 20 ms, the terminal device may determine according to the second correspondence that the first proportion is 10%. That is, the terminal device is required to select 10% of available resources from the candidate resource set. If the candidate resource set includes 20 resources and the number of the available resources in the candidate resource set is 2, the terminal device may determine that the two available resources constitute the first available resource set and further determine the resource for data transmission in the two available resources. It is advantageous to solve the problem of insufficient resources when the proportion of the number of the available resources to the total number of the resources in the candidate resource set is lower than the preset proportion (for example, 20%).

In the embodiment, since different durations of the resource selection windows in the time domain correspond to different proportions of available resources that need to be selected, the problem of insufficient resources or no available resources during resource selection of the terminal device may be solved to a certain extent.

Optionally, the second correspondence is configured for the terminal device by the network device, or the second correspondence is pre-configured in the terminal device.

For example, the network device may configure the second correspondence for the terminal device through semi-persistent signaling (for example, RRC signaling) or dynamic signaling (for example, DCI).

From the above description, it may be seen that the terminal device may determine the first proportion according to the first parameter. Specifically, the terminal device may determine the first proportion according to the transmission delay of the present service in combination with the first correspondence. The terminal device may also determine the first proportion according to the duration of the presently used resource selection window in the time domain in combination with the second correspondence. After the first proportion is determined, the terminal device may determine the first available resource set in the candidate resource set according to the first proportion.

Optionally, if the proportion of the number of the available resources in the candidate resource set to the total number of the resources in the candidate resource set is more than or equal to the first proportion, namely the number of the available resources in the candidate resource set is sufficient, the terminal device may determine the first available resource set in the available resources in the candidate resource set. A proportion of the number of resources in the first available resource set to the total number of the resources in the candidate resource set is the first proportion.

Optionally, if the proportion of the number of the available resources in the candidate resource set to the total number of the resources in the candidate resource set is lower than the first proportion and the number of the available resources in the candidate resource set is not zero, the terminal device may directly determine the available resources in the candidate resource set as the first available resource set and then select the resource for data transmission from the available resources in the candidate resource set. For example, the terminal device may randomly select one or more resources from the available resources in the candidate resource set as resources for data transmission.

If the number of the available resources in the candidate resource set is zero, the terminal device may determine the candidate resource set as the first available resource set and then select the resource for data transmission from the candidate resource set. For example, the terminal device may randomly select one or more resources from the candidate resource set as resources for data transmission.

Optionally, in the embodiment of the disclosure, the method 300 further includes the following operation.

If the proportion of the number of the available resources in the candidate resource set to the total number of the resources in the candidate resource set is lower than the first proportion, the terminal device sends first indication information to the network device. The first indication information is to indicate at least one of: the proportion of the number of the available resources in the candidate resource set to the total number of the resources in the candidate resource set being lower than the first proportion, the total number of the resources in the candidate resource set, or the number of the available resources in the candidate resource set.

Specifically, if the terminal device determines that the proportion of the number of the available resources in the candidate resource set to the total number of the resources in the candidate resource set is lower than the first proportion, the terminal device may send the first indication information to the network device to notify the network device of a present state that the proportion of the number of the available resources in the candidate resource set to the total number of the resources in the candidate resource set is lower than the first proportion. The first indication information may further be used to indicate the total number of the resources in the candidate resource set and/or the number of the available resources in the candidate resource set.

It is to be understood that, in the embodiment of the disclosure, resource selection and sending of the first indication information by the terminal device may be parallel solutions. That is to say, resource selection may be implemented independent of feedback information sent by the network device based on the first indication information. For example, the terminal device may send the first indication information to the network device after resource selection (a specific method for resource selection may refer to descriptions in the abovementioned embodiment). The terminal device may also receive the feedback information sent by the network device after sending the first indication information to the network device and then perform resource selection according to the feedback information of the network device.

How the terminal device performs resource selection according to the feedback information sent by the network device, for example, a third correspondence, a fourth correspondence or a first configuration information, under the condition that the proportion of the number of the available resources in the candidate resource set to the total number of the resources in the candidate resource set is lower than the first proportion will be introduced below in combination with specific embodiments in detail.

In a specific embodiment, the operation that the terminal device determines the first available resource set in the candidate resource set according to the first proportion includes the following operations.

The terminal device receives a third correspondence sent by the network device. The third correspondence is a correspondence between each of multiple transmission delays and a respective one of multiple proportions.

The terminal device determines a second proportion according to the transmission delay of the present service and the third correspondence.

The terminal device determines the first available resource set in the candidate resource set according to the second proportion.

Specifically, under the condition that the proportion of the number of the available resources in the candidate resource set to the total number of the resources in the candidate resource set is lower than the first proportion, the terminal device may send the first indication information to the network device. The network device, after receiving the first indication information, may send the third correspondence to the terminal device. The terminal device may determine the second proportion according to the transmission delay of the present service and the third correspondence and further determine the first available resource set in the candidate resource set according to the second proportion.

Optionally, in the embodiment of the disclosure, the third correspondence is different from the first correspondence, and the second proportion is lower than the first proportion.

Since the second proportion determined by the terminal device according to the transmission delay of the present service and the third correspondence is lower than the first proportion, the problem of insufficient resources or no available resources during resource selection of the terminal device may be favorably solved.

For example, in the first correspondence, the proportion corresponding to the transmission delay of 100 ms is 20%, the proportion corresponding to the transmission delay of 20 ms is 10%, and the proportion corresponding to the transmission delay of 10 ms is 5%. If the transmission delay of the present service is 20 ms, the first proportion determined by the terminal device according to the first correspondence is 10%. If the candidate resource set includes 20 resources and the number of the available resources in the candidate resource set is 1, the terminal device is required to select two available resources according to the first proportion, namely the number of available resources in the candidate resource set is insufficient. Under this condition, the network device may configure the third correspondence for the terminal device. In the third correspondence, a proportion corresponding to the transmission delay of 20 ms is lower than the first proportion and, for example, may be 5%. The terminal device is required to select 5% of available resources from the candidate resource set according to the third correspondence. Since the proportion corresponding to the transmission delay is reduced in the third correspondence, it is advantageous to solve the problem of insufficient resources during resource selection.

In another specific embodiment, the operation that the terminal device determines the first available resource set in the candidate resource set according to the first proportion includes the following operations.

The terminal device receives a fourth correspondence sent by the network device. The fourth correspondence is a correspondence between duration of each of multiple resource selection windows in the time domain and a respective one of multiple proportions.

The terminal device determines a third proportion according to the duration of the presently used resource selection window in the time domain and the fourth correspondence.

The terminal device determines the first available resource set in the candidate resource set according to the third proportion.

Optionally, the fourth correspondence is different from the second correspondence.

Optionally, the third proportion is lower than the first proportion.

Similar to the abovementioned embodiment, under the condition that the proportion of the number of the available resources in the candidate resource set to the total number of the resources in the candidate resource set is lower than the first proportion, the terminal device may send the first indication information to the network device. The network device, after receiving the first indication information, may send the fourth correspondence to the terminal device. The fourth correspondence is different from the second correspondence. The third proportion determined by the terminal device according to the duration of the presently used resource selection window in the time domain and the fourth correspondence is lower than the first proportion, so that the problem of insufficient resources or no available resources during resource selection of the terminal device may be solved.

For example, in the second correspondence, the proportion corresponding to duration of 50 ms of the resource selection window in the time domain is 20%, the proportion corresponding to duration of 20 ms of the resource selection window in the time domain is 10%, and the proportion corresponding to duration of 10 ms of the resource selection window in the time domain is 5%. If the duration of the resource selection window that is presently used, in the time domain is 20 ms, it may be determined according to the second correspondence that the first proportion is 10%, namely the terminal device is required to select 10% of available resources in the candidate resource set. If the candidate resource set includes 20 resources and the number of the available resources in the candidate resource set is 1, according to the first proportion, the number of available resources in the candidate resource set is insufficient. Under this condition, the network device may configure the fourth correspondence for the terminal device. In the fourth correspondence, a proportion corresponding to the duration of 20 ms of the resource selection window in the time domain is lower than the first proportion and, for example, may be 5%. In such case, the terminal device is required to select 5% of available resources from the candidate resource set according to the fourth correspondence. Since the proportion corresponding to the duration of the resource selection window in the time domain is reduced in the fourth correspondence, it is advantageous to solve the problem of insufficient resources during resource selection.

In another specific embodiment, the operation that the terminal device determines the first available resource set in the candidate resource set according to the first proportion includes the following operations.

The terminal device receives first configuration information sent by the network device. The first configuration information is to regulate at least one of the following transmission parameters: a number of available HARQ processes, a number of transmissions of a data packet in each HARQ process, an MCS level or a number of PRBs for each data packet.

The terminal device determines a regulated transmission parameter according to the first configuration information.

The terminal device determines the first available resource set in the candidate resource set according to the regulated transmission parameter.

In the embodiment, under the condition that the proportion of the number of the available resources in the candidate resource set to the total number of the resources in the candidate resource set is lower than the first proportion, the terminal device may send the first indication information to the network device. The network device, after receiving the first indication information, may send the first configuration information to the terminal device. The first configuration information is to configure a new transmission parameter for the terminal device. For example, the network device may configure a relatively small number of HARQ processes or configure a relatively high MCS for the terminal device. In short, the reconfigured transmission parameter is favorable for reducing the number of resources occupied by the terminal device in the resource selection window. In other words, the number of the available resources that may be selected by the terminal device from the candidate resource set according to the reconfigured transmission parameter is increased, thereby solving the problem of insufficient resources or no available resources during resource selection of the terminal device.

Based on the above three embodiments, under the condition that the proportion of the number of the available resources in the candidate resource set to the total number of the resources in the candidate resource set is lower than the first proportion, resource selection of the terminal device is implemented based on the feedback information of the network device, for example, the third correspondence, the fourth correspondence or the first configuration information. The feedback information sent by the network device is based on the first indication information sent by the terminal device.

In general, in the embodiments of the disclosure, under the condition that the proportion of the number of the available resources in the candidate resource set to the total number of the resources in the candidate resource set is lower than the first proportion, resource selection of the terminal device may be implemented independent of the feedback information of the network device. For example, the resource for data transmission is directly determined in the available resources in the candidate resource set. Resource selection of the terminal device may also be implemented according to the feedback information from the network device. For example, resource selection is performed according to the third correspondence, the fourth correspondence or the configuration information.

Optionally, in some specific embodiments, the operation that the terminal device sends the first indication information to the network device includes the following operation.

The terminal device sends uplink RRC signaling to the network device. The uplink RRC signaling includes the first indication information.

That is, the terminal device may send the first indication information to the network device through the uplink RRC signaling. For example, the terminal device may add a new attribute field into the uplink RRC signaling and contain the first indication information in the new attribute field. The terminal device may also contain the first indication information in another message. The terminal device may also contain the first indication information through a new message or signaling. A sending manner for the first indication information is not limited in the embodiment of the disclosure.

Optionally, in a specific embodiment, the operation that the terminal device determines the first available resource set in the candidate resource set according to the first proportion includes the following operations.

If the proportion of the number of the available resources in the candidate resource set to the total number of the resources in the candidate resource set is lower than the first proportion, the terminal device regulates the transmission parameters in at least one of the following manners: reducing a number of HARQ processes, reducing a number of transmissions of a data packet in each HARQ process, improving an MCS level or reducing a number of PRBs for each data packet.

The terminal device determines the first available resource set in the candidate resource set according to the regulated transmission parameters.

In the embodiment, under the condition that the proportion of the number of the available resources in the candidate resource set to the total number of the resources in the candidate resource set is lower than the first proportion, the terminal device may independently regulate its own transmission parameter. By way of example but not limitation, the number of HARQ processes is reduced or the number of transmissions of the data packet in each HARQ process is reduced, as long as the purpose of reducing the number of the resources occupied by the terminal device in the resource selection window may be achieved. When the number of the resources occupied by the terminal device in the resource selection window is reduced, the number of available resources that may be selected in the resource selection window is correspondingly increased, so that the problem of insufficient resources or no available resources during resource selection of the terminal device is favorably solved.

For example, if the candidate resource set includes 20 resources, the number of the available resources in the candidate resource set is 1 and the first proportion is 10%, according to the first proportion, the number of available resources is insufficient. If the current number of HARQ processes is 2 and the number of transmissions of the data packet in each HARQ process is 2, the terminal device may reduce the number of HARQ processes to 1, such that two transmission subframes are idle in the resource selection window. That is, there may be three available resources at this moment. Alternatively, the number of transmissions of the data packet in each HARQ process may be reduced to be 1, such that two transmission subframes may be idle in the resource selection window, namely there may be three available resources at this moment. Therefore, the problem of insufficient resources during resource selection of the terminal device may be solved.

How the terminal device performs resource selection under the condition that the proportion of the number of the available resources in the candidate resource set to the total number of the resources in the candidate resource set is lower than the preset proportion is introduced above in detail. How the terminal device performs resource selection under the condition that the number of the available resources in the candidate resource set is smaller than the preset value will be introduced below in detail. A similar implementation process is adopted and, for simplicity, the similar implementation process will not be described in detail.

Optionally, in an embodiment, S320 may specifically include the following operations.

The terminal device determines a first value according to the first parameter. The first value is to indicate the number of the available resources that need to be selected in the candidate resource set.

The terminal device determines the first available resource set in the candidate resource set according to the first value.

Here, the first parameter, like the first parameter in the abovementioned embodiment, may also include at least one of: the transmission delay of the service or the duration of the resource selection window in the time domain. The resource selection window includes all the resources in the candidate resource set. Elaborations are omitted herein.

Optionally, in a specific embodiment, the first parameter is the transmission delay of the service, and the operation that the terminal device determines the first value according to the first parameter includes the following operation.

The terminal device determines the first value according to the transmission delay of the present service and a fifth correspondence. The fifth correspondence is a correspondence between each of multiple transmission delays and a respective one of multiple values, and each value in the multiple values is to indicate the number of the available resources that need to be selected.

Specifically, in the fifth correspondence, each of the transmission delays may correspond to a respective number of resources. During resource selection, the terminal device may determine the number of the available resources that need to be selected in the candidate resource set according to the transmission delay of the present service and the fifth correspondence and further select the available resources from the candidate resource set according to the determined number. Since different transmission delays correspond to different numbers of available resources that need to be selected, the problem of insufficient resources or no available resources during resource selection of the terminal device may be solved to a certain extent.

For example, in the fifth correspondence, the number of resources corresponding to a transmission delay of 100 ms is 4, the number of resources corresponding to a transmission delay of 20 ms is 2 and the number of resources corresponding to a transmission delay of 10 ms is 1. If the transmission delay of the present service is 20 ms, the terminal device may select two available resources from the candidate resource set.

Optionally, the fifth correspondence is configured for the terminal device by the network device, or the fifth correspondence is pre-configured in the terminal device.

In another specific embodiment, the first parameter is the duration of the resource selection window in the time domain, and the operation that the terminal device determines the first value according to the first parameter includes the following operation.

The terminal device determines the first value according to the duration of the presently used resource selection window in the time domain and a sixth correspondence. The sixth correspondence is a correspondence between duration of each of multiple resource selection windows in the time domain and a respective one of multiple values, and each value in the multiple values is to indicate the number of the available resources that need to be selected.

Specifically, in the sixth correspondence, the duration of each of multiple resource selection windows may correspond to a respective number of resources. During resource selection, the terminal device may determine the number of the available resources that need to be selected in the candidate resource set according to the duration of the resource selection window that is presently used, in the time domain and the sixth correspondence and further select the corresponding number of available resources from the candidate resource set. In the embodiment, since different durations of the resource selection windows in the time domain correspond to different numbers of available resources that need to be selected, the problem of insufficient resources or no available resources during resource selection of the terminal device may be solved to a certain extent.

For example, in the sixth correspondence, the number of resources corresponding to duration of 50 ms of the resource selection window in the time domain is 4, the number of resources corresponding to duration of 20 ms of the resource selection window in the time domain is 2, and the number of resources corresponding to duration of 10 ms of the resource selection window in the time domain is 1. If the duration of the presently used resource selection window in the time domain is 20 ms, the terminal device may select two available resources from the candidate resource set.

Optionally, the sixth correspondence is configured for the terminal device by the network device, or the sixth correspondence is pre-configured in the terminal device.

In short, the terminal device may determine the first value according to the first parameter. Specifically, the terminal device may determine the first value according to the transmission delay of the present service in combination with the fifth correspondence. The terminal device may also determine the first value according to the duration of the presently used resource selection window in the time domain in combination with the sixth correspondence. After the first value is determined, the terminal device may determine the first available resource set in the candidate resource set according to the first value.

Optionally, if the number of the available resources in the candidate resource set is more than or equal to the first value, namely the number of available resources in the candidate resource set is sufficient, the terminal device may determine the first available resource set in the available resources in the candidate resource set. The number of the resources in the first available resource set is the first value.

If the number of the available resources in the candidate resource set is larger than zero and smaller than the first value, the terminal device may directly determine the available resources in the candidate resource set as the first available resource set, namely the resource for data transmission is selected from the available resources in the candidate resource set. For example, the terminal device may randomly select one or more resources from the available resources in the candidate resource set as resources for data transmission.

Optionally, if the number of the available resources in the candidate resource set is zero, the terminal device may determine the candidate resource set as the first available resource set and then determine the resource for data transmission in the candidate resource set. For example, the terminal device randomly selects one or more resources from the candidate resource set as resources for data transmission.

Optionally, in the embodiment of the disclosure, the method 300 further includes the following operation.

If the number of the available resources in the candidate resource set is smaller than the first value, the terminal device sends second indication information to the network device. The second indication information is to indicate at least one of: the number of the available resources in the candidate resource set being smaller than the first value, the total number of the resources in the candidate resource set or the number of the available resources in the candidate resource set.

Specifically, under the condition that the number of the available resources in the candidate resource set is smaller than the first value, the terminal device may send the second indication information to the network device to notify the network device of a present state that the number of the available resources in the candidate resource set is smaller than the first value. The second indication information may further be used to indicate the total number of the resources in the candidate resource set and/or the number of the available resources in the candidate resource set.

It is to be understood that resource selection and sending of the second indication information by the terminal device may be parallel solutions. In other words, resource selection of the terminal device may be implemented independent of the feedback information sent by the network device based on the second indication information. For example, the terminal device may send the second indication information to the network device after resource selection. The terminal device may also receive the feedback information returned by the network device after sending the second indication information to the network device and perform resource selection according to the feedback information sent by the network device.

How the terminal device performs resource selection according to the feedback information sent by the network device, for example, a seventh correspondence, an eighth correspondence or a second configuration information, under the condition that the number of the available resources in the candidate resource set is smaller than the first value will be introduced below in combination with specific embodiments in detail.

In a specific embodiment, the operation that the terminal device determines the first available resource set in the candidate resource set according to the first value includes the following operations.

The terminal device receives a seventh correspondence sent by the network device. The seventh correspondence is a correspondence between each of multiple transmission delays and a respective one of multiple values.

The terminal device determines a second value according to the transmission delay of the present service and the seventh correspondence.

The terminal device determines the first available resource set in the candidate resource set according to the second value.

Optionally, the seventh correspondence is different from the fifth correspondence.

Optionally, the second value is smaller than the first value.

Specifically, under the condition that the number of the available resources in the candidate resource set is smaller than the first value, the terminal device may send the second indication information to the network device. The network device, after receiving the second indication information, may send the seventh correspondence to the terminal device. The seventh correspondence is different from the fifth correspondence. The second value determined by the terminal device according to the transmission delay of the present service and the seventh correspondence is smaller than the first value determined according to the fifth correspondence. Resource selection is performed according to the newly configured seventh correspondence, which is favorable for solving the problem of insufficient resources or no available resources during resource selection of the terminal device.

In another specific embodiment, the operation that the terminal device determines the first available resource set in the candidate resource set according to the first value includes the following operations.

The terminal device receives an eighth correspondence sent by the network device. The eighth correspondence is a correspondence between duration of each of multiple resource selection windows in the time domain and a respective one of multiple values.

The terminal device determines a third value according to the duration of the presently used resource selection window in the time domain and the eighth correspondence.

The terminal device determines the first available resource set in the candidate resource set according to the third value.

Optionally, the eighth correspondence is different from the sixth correspondence.

Optionally, the third value is smaller than the first value.

Specifically, under the condition that the number of the available resources in the candidate resource set is smaller than the first value, the terminal device may send the second indication information to the network device. The network device, after receiving the second indication information, may send the eighth correspondence to the terminal device. The eighth correspondence is different from the sixth correspondence. The third value determined by the terminal device according to the duration of the resource selection window that is presently used, in the time domain and the eighth correspondence is smaller than the first value determined according to the sixth correspondence. Resource selection is performed according to the newly configured eighth correspondence, which is favorable for solving the problem of insufficient resources or no available resources during resource selection of the terminal device.

As another specific embodiment, the operation that terminal device determines the first available resource set in the candidate resource set according to the first value includes the following operations.

The terminal device receives second configuration information sent by the network device. The second configuration information is used to regulate at least one of the following transmission parameters: a number of available HARQ processes, a number of transmissions of the data packet in each HARQ process, the MCS level or the number of the PRBs for each data packet.

The terminal device determines the regulated transmission parameter according to the second configuration information.

The terminal device determines the first available resource set in the candidate resource set according to the regulated transmission parameter.

In the embodiment, under the condition that the number of the available resources in the candidate resource set is smaller than the first value, the terminal device may send the second indication information to the network device. The network device, after receiving the second indication information, may send the second configuration information to the terminal device. The second configuration information is used to configure a new transmission parameter for the terminal device. For example, the network device may configure a relatively small number of HARQ processes or configure a relatively high MCS for the terminal device. In short, the reconfigured transmission parameter may be favorable for reducing the number of resources occupied by the terminal device in the resource selection window. In other words, the number of the available resources that may be selected by the terminal device from the candidate resource set according to the reconfigured transmission parameter is increased, so that the problem of insufficient resources or no available resources during resource selection of the terminal device is favorably solved.

Optionally, in the embodiment of the disclosure, the operation that the terminal device sends the second indication information to the network device includes the following operation.

The terminal device sends uplink RRC signaling to the network device. The uplink RRC signaling includes the second indication information.

Based on the above three embodiments, under the condition that the number of the available resources in the candidate resource set is smaller than the first value, resource selection of the terminal device is implemented based on the feedback information of the network device, for example, the seventh correspondence, the eighth correspondence or the second configuration information, and the feedback information sent by the network device is based on the second indication information sent by the terminal device. That is, in the embodiment of the disclosure, under the condition that the number of the available resources in the candidate resource set is smaller than the first value, resource selection of the terminal device may be implemented independent of the feedback information of the network device. For example, the resource for data transmission is directly determined in the available resources in the candidate resource set. Resource selection of the terminal device may also be implemented according to the feedback information of the network device. For example, resource selection is performed according to the seventh correspondence, the eighth correspondence or the second configuration information.

Optionally, in a specific embodiment, the operation that the terminal device determines the first available resource set in the candidate resource set according to the first value includes the following operations.

If the number of the available resources in the candidate resource set is smaller than the first value, the terminal device regulates the transmission parameters in at least one of the following manners: reducing a number of HARQ processes, reducing a number of transmissions of the data packet in each HARQ process, improving the MCS level or reducing the number of the PRBs for each data packet.

The terminal device determines the first available resource set in the candidate resource set according to the regulated transmission parameter.

In the embodiment, under the condition that the number of the available resources in the candidate resource set is smaller than the first value, the terminal device may independently regulate its own transmission parameter. By way of example but not limitation, the number of HARQ processes is reduced or the number of transmissions of the data packet in each HARQ process is reduced, as long as the purpose of reducing the number of the resources occupied by the terminal device in the resource selection window may be achieved. When the number of the resources occupied by the terminal device in the resource selection window is reduced, the number of the available resources that may be selected in the resource selection window is correspondingly increased, so that the problem of insufficient resources during resource selection of the terminal device is favorably solved.

Particularly, the operation that the terminal device determines the first available resource set in the candidate resource set according to the first value includes the following operation.

If the number of the available resources in the candidate resource set is more than or equal to the first value, the first available resource set is determined in the available resources. The number of resources in the first available resource set is equal to the first value.

If the number of the available resources in the candidate resource set is more than or equal to the first value, it is indicated that the number of available resources in the candidate resource set is sufficient. The terminal device may directly select resources in the available resources in the candidate resource set to form the first available resource set, and the number of the selected resources is the first value.

The method embodiment of the disclosure is described above in combination with FIG. 3 in detail and a device embodiment of the disclosure will be described below in combination with FIG. 4 to FIG. 5 in detail. It is to be understood that the device embodiment corresponds to the method embodiment and similar descriptions may refer to the method embodiment.

FIG. 4 is a schematic block diagram of a device 400 for resource selection according to an embodiment of the disclosure. As shown in FIG. 4, the device 400 includes a determination unit 410.

The determination unit 410 is configured to: determine that a proportion of a number of available resources in a candidate resource set to a total number of resources in the candidate resource set is lower than a preset proportion, or the number of the available resources in the candidate resource set is smaller than a preset value; determine a first available resource set in the candidate resource set and determine a resource for data transmission in the first available resource set.

Optionally, in some embodiments, the determination module 410 is specifically configured to: if the number of the available resources in the candidate resource set is not zero, determine a set of available resources in the candidate resource set as the first available resource set.

Optionally, in some embodiments, the determination module 410 is specifically configured to: randomly select one or more resources from the first available resource set as resources for data transmission.

Optionally, in some embodiments, the determination module 410 is further configured to: determine a first proportion according to a first parameter, the first proportion being to indicate a proportion of the number of available resources that need to be selected to the total number of the resources in the candidate resource set; and determine the first available resource set in the candidate resource set according to the first proportion.

Optionally, in some embodiments, the first parameter includes at least one of: a transmission delay of a service or duration of a resource selection window in a time domain. The resource selection window includes all the resources in the candidate resource set.

Optionally, in some embodiments, the first parameter is the transmission delay of the service, and the determination module 410 is specifically configured to: determine the first proportion according to a transmission delay of a present service and a first correspondence. The first correspondence is a correspondence between each of multiple transmission delays and a respective one of multiple proportions and each proportion in the multiple proportions is to indicate the proportion of the number of the available resources that need to be selected to the total number of the resources in the candidate resource set.

Optionally, in some embodiments, the first correspondence is configured by a network device, or the first correspondence is pre-configured.

Optionally, in some embodiments, the first parameter is the duration of the resource selection window in the time domain, and the determination module 410 is specifically configured to: determine the first proportion according to duration of a presently used resource selection window in the time domain and a second correspondence. The second correspondence is a correspondence between duration of each of multiple resource selection windows in the time domain and a respective one of multiple proportions and each proportion in the multiple proportions is to indicate the proportion of the number of the available resources that need to be selected to the total number of the resources in the candidate resource set.

Optionally, in some embodiments, the second correspondence is configured by the network device, or the second correspondence is pre-configured.

Optionally, in some embodiments, the device further includes a communication module.

The communication module is configured to, under the condition that the proportion of the number of the available resources in the candidate resource set to the total number of the resources in the candidate resource set is lower than the first proportion, send first indication information to the network device.

The first indication information is to indicate at least one of: the proportion of the number of the available resources in the candidate resource set to the total number of the resources in the candidate resource set being lower than the first proportion, the total number of the resources in the candidate resource set or the number of the available resources in the candidate resource set.

Optionally, in some embodiments, the communication module is further configured to receive a third correspondence sent by the network device. The third correspondence is a correspondence between each of multiple transmission delays and a respective one of multiple proportions.

The determination module 410 is specifically configured to: determine a second proportion according to the transmission delay of the present service and the third correspondence; and determine the first available resource set in the candidate resource set according to the second proportion.

Optionally, the third correspondence is different from the first correspondence, and the second proportion is lower than the first proportion.

Optionally, in some embodiments, the communication module is further configured to receive a fourth correspondence sent by the network device. The fourth correspondence is a correspondence between duration of each of multiple resource selection windows in the time domain and a respective one of multiple proportions.

The determination module 410 is specifically configured to: determine a third proportion according to the duration of the presently used resource selection window in the time domain and the fourth correspondence; and determine the first available resource set in the candidate resource set according to the third proportion.

Optionally, the fourth correspondence is different from the second correspondence.

Optionally, the third proportion is lower than the first proportion.

Optionally, in some embodiments, the communication module is further configured to receive first configuration information sent by the network device.

The first configuration information is to regulate at least one of the following transmission parameters: a number of available HARQ processes, a number of transmissions of a data packet in each HARQ process, an MCS level or a number of PRBs for each data packet.

The determination module 410 is specifically configured to: determine a regulated transmission parameter according to the first configuration information; and determine the first available resource set in the candidate resource set according to the regulated transmission parameter.

Optionally, in some embodiments, the communication module is specifically configured to send uplink RRC signaling to the network device. The uplink RRC signaling includes the first indication information.

Optionally, in some embodiments, the device 400 further includes a regulation module.

The regulation module is configured to, under the condition that the proportion of the number of the available resources in the candidate resource set to the total number of the resources in the candidate resource set is lower than the first proportion, regulate the transmission parameters in at least one of the following manners: reducing a number of HARQ processes, reducing a number of transmissions of the data packet in each HARQ process, improving an MCS level or reducing a number of PRBs for each data packet.

The determination module 410 is specifically configured to determine the first available resource set in the candidate resource set according to the regulated transmission parameter.

Optionally, in some embodiments, the determination module 410 is specifically configured to: if the proportion of the number of the available resources in the candidate resource set to the total number of the resources in the candidate resource set is more than or equal to the first proportion, determine the first available resource set from the available resources. A proportion of the number of resources in the first available resource set to the total number of the resources in the candidate resource set is the first proportion.

Optionally, in some embodiments, the determination module 410 is specifically configured to if the number of the available resources in the candidate resource set is zero, determine the candidate resource set as the first available resource set.

Optionally, in some embodiments, the determination module 410 is specifically configured to randomly select one or more resources from the candidate resource set as resources for data transmission.

Optionally, in some embodiments, the determination module 410 is specifically configured to: determine a first value according to the first parameter, the first value being to indicate the number of the available resources that need to be selected in the candidate resource set; and determine the first available resource set in the candidate resource set according to the first value.

Optionally, in some embodiments, the first parameter includes at least one of: the transmission delay of the service and the duration of the resource selection window in the time domain. The resource selection window includes all the resources in the candidate resource set.

Optionally, in some embodiments, the first parameter is the transmission delay of the service, and the determination module 410 is specifically configured to determine the first value according to the transmission delay of the present service and a fifth correspondence. The fifth correspondence is a correspondence between each of multiple transmission delays and a respective one of multiple values and each value in the multiple values is to indicate the number of the available resources that need to be selected.

Optionally, in some embodiments, the fifth correspondence is configured by the network device, or the fifth correspondence is pre-configured.

Optionally, in some embodiments, the first parameter is the duration of the resource selection window in the time domain, and the determination module 410 is specifically configured to determine the first value according to the duration of the presently used resource selection window in the time domain and a sixth correspondence. The sixth correspondence is a correspondence between duration of each of multiple resource selection windows in the time domain and a respective one of multiple values and each value in the multiple values is to indicate the number of the available resources that need to be selected.

Optionally, in some embodiments, the sixth correspondence is configured by the network device, or the sixth correspondence is pre-configured.

Optionally, in some embodiments, the device 400 further includes the communication module.

The communication module is configured to, under the condition that the number of the available resources in the candidate resource set is smaller than the first value, send second indication information to the network device.

The second indication information is to indicate at least one of: the number of the available resources in the candidate resource set being smaller than the first value, the total number of the resources in the candidate resource set or the number of the available resources in the candidate resource set.

Optionally, in some embodiments, the communication module is further configured to receive a seventh correspondence sent by the network device. The seventh correspondence is a correspondence between each of multiple transmission delays and a respective one of multiple values.

The determination module 410 is specifically configured to: determine a second value according to the transmission delay of the present service and the seventh correspondence;

and determine the first available resource set in the candidate resource set according to the second value.

Optionally, the seventh correspondence is different from the fifth correspondence.

Optionally, the second value is smaller than the first value.

Optionally, in some embodiments, the communication module is further configured to receive an eighth correspondence sent by the network device. The eighth correspondence is a correspondence between duration of each of multiple resource selection windows in the time domain and a respective one of multiple values.

The determination module 410 is specifically configured to: determine a third value according to the duration of the presently used resource selection window in the time domain and the eighth correspondence; and determine the first available resource set in the candidate resource set according to the third value.

Optionally, the eighth correspondence is different from the sixth correspondence.

Optionally, the third value is smaller than the first value.

Optionally, in some embodiments, the communication module is further configured to receive second configuration information sent by the network device.

The second configuration information is to regulate at least one of the following transmission parameters: a number of available HARQ processes, a number of transmissions of the data packet in each HARQ process, the MCS level or the number of the PRBs for each data packet.

The determination module 410 is specifically configured to: determine the regulated transmission parameter according to the second configuration information; and determine the first available resource set in the candidate resource set according to the regulated transmission parameter.

Optionally, in some embodiments, the communication module is specifically configured to send uplink RRC signaling to the network device. The uplink RRC signaling includes the second indication information.

Optionally, in some embodiments, the device 400 further includes the regulation module.

The regulation module is configured to, under the condition that the number of the available resources in the candidate resource set is smaller than the first value, regulate the transmission parameters in at least one of the following manners: reducing a number of HARQ processes, reducing a number of transmissions of the data packet in each HARQ process, improving the MCS level or reducing the number of the PRBs for each data packet.

The determination module 410 is specifically configured to determine the first available resource set in the candidate resource set according to the regulated transmission parameter.

Optionally, in some embodiments, the determination module 410 is specifically configured to: if the number of the available resources in the candidate resource set is more than or equal to the first value, determine the first available resource set from the available resources. The number of resources in the first available resource set is equal to the first value.

It is to be understood that the device 400 according to the embodiment of the disclosure may correspond to the terminal device in the method embodiment of the disclosure. The abovementioned and other operations and/or functions of each unit in the device 400 are used to implement the corresponding flows executed by the terminal device in the method 300 shown in FIG. 3 respectively and will not be elaborated herein for simplicity.

Figure 5:
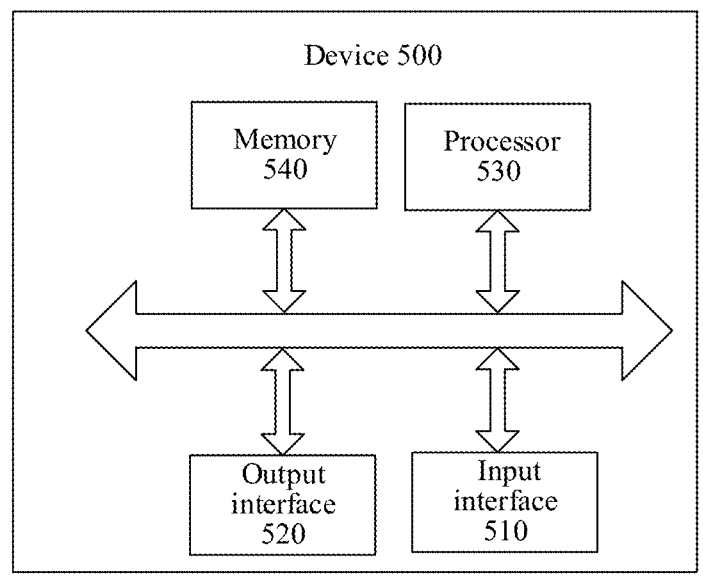
FIG. 5 is a schematic block diagram of a data transmission device according to another embodiment of the disclosure.

As shown in FIG. 5, an embodiment of the disclosure provides a device 500 for resource selection. The terminal device 500 may be the device 400 in FIG. 4, and may be configured to execute contents executed by the terminal device in the method 300 in FIG. 3. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, the instruction or the code in the memory 540 to control the input interface 510 to receive a signal, control the output interface 520 to send a signal and complete operations in the method embodiments.

It is to be understood that, in the embodiment of the disclosure, the processor 530 may be a Central Processing Unit (CPU) and the processor 530 may also be another universal processor, a Digital Signal Processor (DSP), an Application Specific Integrated Circuit (ASIC), a Field-Programmable Gate Array (FPGA) or another programmable logic device, discrete gate or transistor logic device, discrete hardware component and the like. The universal processor may be a microprocessor or the processor may also be any conventional processor and the like.

The memory 540 may include a Read-Only Memory (ROM) and a Random Access Memory (RAM) and provides an instruction and data for the processor 530. A portion of the memory 540 may further include a nonvolatile RAM. For example, the memory 540 may further store information of a device type.

In an implementation process, each content of the method may be completed by an integrated logic circuit in hardware form in the processor 530 or an instruction in a software form. The contents of the method disclosed in combination with the embodiments of the disclosure may be directly embodied to be executed and completed by a hardware processor, or may be executed and completed by a combination of software modules and the hardware in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the contents of the method in combination with the hardware therein. No more detailed descriptions will be made herein to avoid repetitions.

In a specific implementation, the communication module in the terminal device 400 shown in FIG. 4 may be implemented by the input interface 510 and output interface 520 in FIG. 5, and the determination module 410 and the regulation module in the device 400 shown in FIG. 4 may be implemented by the processor 530 in FIG. 5.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may implement the described functions for each specific application by use of a respective method, and such implementation shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, the displayed or discussed mutual coupling or direct coupling or communication connection may be indirect coupling or communication connection implemented through some interfaces, devices or units, and may be electrical, mechanical or adopt other forms.

The units described as separate parts may or may not be physically separated, and parts displayed as units may or may not be physical units, namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

Disclosed above are merely several specific embodiments of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for resource selection, comprising:
determining, by a terminal device, that a proportion of a number of available resources in a candidate resource set to a total number of resources in the candidate resource set is lower than a first proportion, wherein the first proportion is determined by the terminal device according to a first parameter, the first proportion is used to indicate a proportion of a number of available resources that need to be selected to the total number of the resources in the candidate resource set, and the first parameter comprises a transmission delay of a service;
determining, by the terminal device, a first available resource set in the candidate resource set according to the first proportion; and
determining, by the terminal device, a resource for data transmission in the first available resource set.

2. The method of claim 1, wherein determining, by the terminal device, the resource for data transmission in the first available resource set comprises:
randomly selecting, by the terminal device, one or more resources from the first available resource set as resources for data transmission.

3. The method of claim 1, wherein determining, by the terminal device, the first proportion according to the first parameter comprises:
determining, by the terminal device, the first proportion according to a transmission delay of a present service and a first correspondence, wherein the first correspondence is a correspondence between each of a plurality of transmission delays and a respective one of a plurality of proportions, and each of the plurality of proportions is to indicate the proportion of the number of the available resources that need to be selected to the total number of the resources in the candidate resource set.

4. The method of claim 3, wherein the first correspondence is configured for the terminal device by a network device, or the first correspondence is pre-configured in the terminal device.

5. The method of claim 1, further comprising:
in the case that the proportion of the number of the available resources in the candidate resource set to the total number of the resources in the candidate resource set is lower than the first proportion, sending, by the terminal device, first indication information to a network device, wherein the first indication information is to indicate at least one of:
the proportion of the number of the available resources in the candidate resource set to the total number of the resources in the candidate resource set being lower than the first proportion, the total number of the resources in the candidate resource set or the number of the available resources in the candidate resource set.

6. The method of claim 1, wherein determining, by the terminal device, the first available resource set in the candidate resource set according to the first proportion comprises:
in the case that the proportion of the number of the available resources in the candidate resource set to the total number of the resources in the candidate resource set is lower than the first proportion, regulating, by the terminal device, transmission parameters in at least one of the following manners:
reducing a number of Hybrid Automatic Repeat reQuest (HARQ) processes, reducing a number of transmissions of a data packet in each HARQ process, improving a Modulation and Coding Scheme (MCS) level or reducing a number of Physical Resource Blocks (PRBs) for each data packet; and
determining, by the terminal device, the first available resource set in the candidate resource set according to the regulated transmission parameter.

7. The method of claim 1, wherein determining, by the terminal device, the first available resource set in the candidate resource set according to the first proportion comprises:
in the case that the proportion of the number of the available resources in the candidate resource set to the total number of the resources in the candidate resource set is more than or equal to the first proportion, determining the first available resource set in the available resources, wherein a proportion of a number of resources in the first available resource set to the total number of the resources in the candidate resource set is the first proportion.

8. The method of claim 1, wherein determining, by the terminal device, the first available resource set in the candidate resource set according to the first proportion comprises:

in the case that the number of the available resources in the candidate resource set is zero, determining, by the terminal device, the candidate resource set as the first available resource set.

9. A device for resource selection, comprising:

a processor; and a memory for storing instructions executable by the processor, wherein the processor is configured to execute the instructions to:

determine that a proportion of a number of available resources in a candidate resource set to a total number of resources in the candidate resource set is lower than a first proportion, wherein the first proportion is determined according to a first parameter, the first proportion is used to indicate a proportion of a number of available resources that need to be selected to the total number of the resources in the candidate resource set, and the first parameter comprises a transmission delay of a service;

determine a first available resource set in the candidate resource set according to the first proportion and determine a resource for data transmission in the first available resource set.

10. The device of claim 9, wherein the processor is specifically configured to:

randomly select one or more resources from the first available resource set as resources for data transmission.

11. The device of claim 9, wherein the processor is specifically configured to:

determine the first proportion according to a transmission delay of a present service and a first correspondence, wherein the first correspondence is a correspondence between each of a plurality of transmission delays and a respective one of a plurality of proportions, and each of the plurality of proportions is to indicate the number of the available resources that need to be selected to the total number of the resources in the candidate resource set.

12. The device of claim 11, wherein the first correspondence is configured by a network device, or the first correspondence is pre-configured.

13. The device of claim 9, further comprising:

an output interface, configured to, under the condition that the proportion of the number of the available resources in the candidate resource set to the total number of the resources in the candidate resource set is lower than the first proportion, send first indication information to a network device, wherein the first indication information is to indicate at least one of:

the proportion of the number of the available resources in the candidate resource set to the total number of the resources in the candidate resource set being lower than the first proportion, the total number of the resources in the candidate resource set or the number of the available resources in the candidate resource set.

14. The device of claim 9, wherein the processor is further configured to:

under the condition that the proportion of the number of the available resources in the candidate resource set to the total number of the resources in the candidate resource set is lower than the first proportion, regulate transmission parameters in at least one of the following manners:

reducing a number of Hybrid Automatic Repeat reQuest (HARQ) processes, reducing a number of transmissions of a data packet in each HARQ process, improving a Modulation and Coding Scheme (MCS) level or reducing a number of Physical Resource Blocks (PRBs) for each data packet, and wherein the processor is specifically configured to:

determine the first available resource set in the candidate resource set according to the regulated transmission parameter.

* * * * *